United States Patent
Hirstius et al.

(10) Patent No.: US 7,349,921 B2
(45) Date of Patent: Mar. 25, 2008

(54) INFORMATION DISTRIBUTION SYSTEM

(75) Inventors: Charles Hirstius, Northbrook, IL (US); Mark Diatte, Noorwood Park, IL (US); Curt Hayden, Gurnee, IL (US)

(73) Assignee: Walgreen Co., Deerfield, IL (US)

( * ) Notice: Subject to any disclaimer, the term of this patent is extended or adjusted under 35 U.S.C. 154(b) by 528 days.

(21) Appl. No.: 10/256,584

(22) Filed: Sep. 27, 2002

(65) Prior Publication Data

US 2004/0064429 A1    Apr. 1, 2004

(51) Int. Cl.
*G06F 17/00* (2006.01)
*G06F 15/16* (2006.01)

(52) U.S. Cl. .............. 707/104.1; 707/100; 707/103 R; 709/219

(58) Field of Classification Search ............ 707/1, 707/4, 10, 100, 103 R, 104.1, 200, 2; 345/716; 713/176, 201; 705/3, 28; 709/226, 238; 715/517, 716, 810
See application file for complete search history.

(56) References Cited

U.S. PATENT DOCUMENTS

| | | | |
|---|---|---|---|
| 6,513,118 B1 * | 1/2003 | Iwamura | 713/176 |
| 6,522,342 B1 * | 2/2003 | Gagnon et al. | 715/716 |
| 6,583,797 B1 * | 6/2003 | Roth | 715/810 |
| 6,785,675 B1 * | 8/2004 | Graves et al. | 707/4 |
| 2001/0049727 A1 * | 12/2001 | Mukherjee et al. | 709/219 |
| 2002/0174366 A1 * | 11/2002 | Peterka et al. | 713/201 |

FOREIGN PATENT DOCUMENTS

EP    1239673 A2 *   9/2002

* cited by examiner

*Primary Examiner*—Cam Y Truong
*Assistant Examiner*—Fred I Ehichioya
(74) *Attorney, Agent, or Firm*—Marshall Gerstein & Borun LLP; Francis C. Kowalik

(57) ABSTRACT

An information distribution system may be used to communicate information from a central server to a number of repository systems, which may store and further distribute the information to clients. Users may make requests for the central server to distribute particular information to repository systems and further to clients. The central server may batch requests for redundant information over a time period and may and distribute the requested information at off-peak communication traffic times. The repository systems, as well as the clients, may provide to a user a central catalog listing information that is both local and available from the central server upon request. The central catalog may include categorizations organized to provide users with an easily readable interface. For example, the central catalog may include seasonal, employee, corporate news and advertising categories into which informational content may be organized.

32 Claims, 14 Drawing Sheets

INFORMATION DISTRIBUTION SYSTEM

TECHNICAL FIELD

The present disclosure pertains to information distribution and, more particularly, to an information distribution system capable of providing to a user locally-resident data and the ability to request data from an alternate information source when desired data is not locally resident.

BACKGROUND

Information distribution has become increasingly important in today's society, in general, and to corporate entities in particular. Presently, corporations invest a tremendous amount of capital into various forms of information distribution. For example, a corporation may lay out substantial funds to distribute printed information throughout its various organizational branches or retail distribution outlets. However, as will be readily appreciated, the rate at which printed material becomes obsolete has accelerated in recent times. Accordingly, there has been a drive to distribute information in a more frequent, faster and more economical mode than printed media.

The rapid growth of the Internet, along with wide area networks (WANs) and local area networks (LANs), in tandem with the multimedia capabilities of personal computers and servers have made electronic media distribution the information dissemination mode of choice. For example, while corporate memoranda were once painstakingly copied or printed hundreds or thousands of times and distributed to employees, now a company-wide e-mail may be sent attaching the memoranda, thereby saving copy and distribution time and cost.

While broadband hypertext transport protocol (HTTP) or Internet protocol (IP) based networks providing TI, direct subscriber line (DSL) or cable connections are widely available, not all remote locations of a corporation, such as a corporation having multiple retail outlets, necessarily have access to broadband connections. Accordingly, electronic distribution of information in all corporate system is not always a reality.

Some retail outlets not having access to broadband connections may receive information through wide area broadcasts. In such cases, a satellite information distribution system may be used to broadcast information, which may be digital information or analog television information, to numerous retail outlets. For example, a speech of a corporate official may be repeatedly broadcast via satellite over a particular time period so that employees at various retail locations may view the speech. Wide area broadcasts, such as satellite broadcasts, are quite expensive. Therefore, as an alternative, the speech could be broadcast once and each retail outlet could record the broadcast for replay at periodic intervals to minimize broadcast expenses.

DETAILED DESCRIPTION

As described below, an information distribution system may be used to communicate information from a central server to a number of repository systems, which may store and further distribute the information to clients. Users may make requests for the central location to distribute particular information to repository systems and further to clients. The central server may batch requests for redundant information over a time period and may and distribute the requested information at off-peak communication traffic times.

As further described below, the repository systems, as well as the clients, may provide to a user a central catalog listing information that is both local and available from the central server upon request. The central catalog may include categorizations organized to provide users with an easily readable interface. For example, the central catalog may include seasonal, employee, corporate news and advertising categories into which informational content may be organized.

Figure 1:
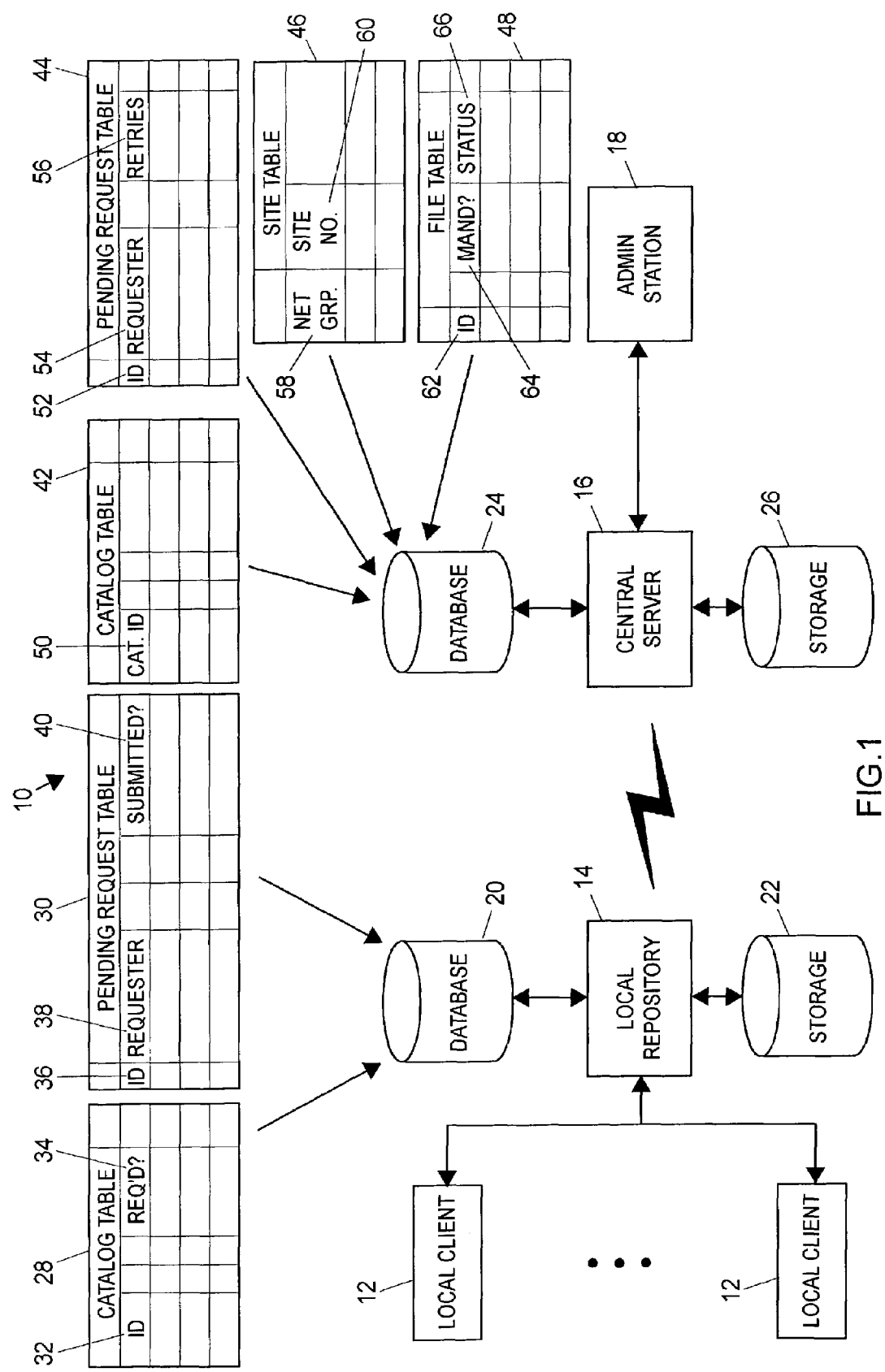
FIG. 1 is a diagram of an example information distribution system.

Turning to FIG. 1, an information system 10 generally includes one or more local clients 12, a local repository 14, a central server 16 and an administration station (admin station) 18. The local repository 14 has an associated database 20 and an associated storage component 22, which may be part of the local repository 14 itself, or may be separate therefrom. Similarly, the central server 16 has an associated database 24 and an associated storage component 26, which may be part of the central server 16, or may be separate therefrom.

The local clients 12 are communicatively coupled to the local repository 14 by network connections such as an Ethernet connection or any other suitable network connection including a wireless connection. Additionally, the local repository 14 may be connected to the central server 16 through a wired or wireless communication link. For example, it is contemplated that the communication link could be embodied in a LAN, WAN or any other suitable network topology. The WAN may be embodied, for example, in a terrestrial wired or wireless link or in a satellite-based wireless communication link.

The database 20 includes a catalog table 28 and a pending request table 30 and may include other tables. Among numerous fields that the catalog table 28 may include are an identification field 32 and a requested field 34. The pending request table 30 includes, among other fields, an identification field 36, a requester field 38 and a submitted field 40. A description of the interaction of the local repository 14 with the catalog table 28 and the pending request table 30 is provided below in connection with FIGS. 2-4.

The database 24 includes, among other tables, a catalog table 42, a pending request table 44, a site table 46 and a file table 48. The catalog table 42 includes a catalog ID field 50 and any other suitable fields. The pending request table 44 includes an identification field 52, a requester field 54 and a retries field 56. The site table 46 includes a network group field 58 and a site number field 60. The file table 48 includes an identification field 62, a mandatory field 64 and a status field 66. A description of the interaction between the central server 16 and the database 24 and its associated tables 42-46 is provided below in conjunction with FIGS. 2-4.

In terms of hardware, the local clients 12 may be embodied in personal computers having, for example, Intel Pentium 200 Megahertz (MHz) processors, 48 megabytes (MB) of random access memory (RAM) and 2 MB of video RAM on a video card capable of 800×600×16 color display resolution. The local clients 12 may also include a hard disk drive having 50 MB or more of free disk space and an Ethernet network interface card. Additionally, the local clients 12 may include a sound card, speakers or headphones for audio output. In terms of software, the local clients 12 may utilize a Windows NT 4.0 SP5 operating system, a web browser such as, for example, Internet Explorer 5.0, a media player such as the Windows Media Player 6.4, which may include additional codecs. Additional software executed by the local clients 12 may include ActiveState ActivePerl, including PerlScript.

The local repository 14 may be embodied in, for example, a server that may include an Intel Pentium III 866 MHz processor and 128 MB of RAM. The local repository 14 may also include an Ultra ATA 100 IDE Controller, a 40 gigabyte (GB) Ultra ATA 100 IDE hard disk drive having 20 GB of free disk space, which is sufficient to hold approximately 80 hours of MPEG-compressed video that is 512 KB encoded or is sufficient to hold 10,000 bitmap images that are approximately 2 MB in size each. Additionally, the local repository 14 may include Apache 1.3 Web Server software.

The central server 16 may be conceptualized as two separate servers: a web application server and a central repository server. The functionality of the web application server and the central repository server may be integrated into a single server or may be embodied in two separate servers. Regardless of the server configuration selected, the web application server portion of the central server 16 may include an Intel Pentium III 733 MHz processor, 256 MB of RAM, an Ultra2, 2 channel RAID SCSI hard disk controller and a 50 GB hard disk drive. The web application server may also include a 10/100 Ethernet network interface card. Additionally, the web application server may operate using software including, but not limited to, a RedHat Linux 6.2 operating system, Apache web server, Oracle 8.0i R2 database and Perl 5.6.0.

The central repository server portion of the central server 16 may include a 2-way Intel Pentium III 733 MHz processor, 1 GB of RAM, an Ultra2, 2 channel RAID SCSI disk controller, a 100 GB hard drive and a 10/100 Ethernet network interface card. The central repository server may operate software such as, for example, a RedHat Linux 6.2 operating system, Apache web server, Oracle 8.0i R2 database, Tactix MRCP and Perl 5.6.0.

As will be readily appreciated by those having ordinary skill in the art, the foregoing hardware and software in which the local clients 12, the local repository 14 and the central server 16 are described as being embodied are merely exemplary and numerous modifications may be made thereto. Accordingly, while the foregoing is set forth for purposes of explanation, the concepts disclosed herein may be embodied in any number of different hardware and software combinations and, therefore, the foregoing examples are not to be considered as limiting.

While the information system 10 is shown in FIG. 1 as including two local clients 12, one local repository 14, one central server 16 and one admin station 18, those having ordinary skill in the art will readily appreciate that the information system 10 may include more or fewer components than are shown in FIG. 1. Accordingly, the information system 10 may be scaled to include any desirable number of local repositories 14 and local clients 12. Additionally, while the following description includes descriptions of users accessing the local clients 12, the local clients 12 shown in FIG. 1 are optional and the functionality thereof could be incorporated into the local repository 14. Accordingly, users could access information via the local repository 14.

Figure 2:
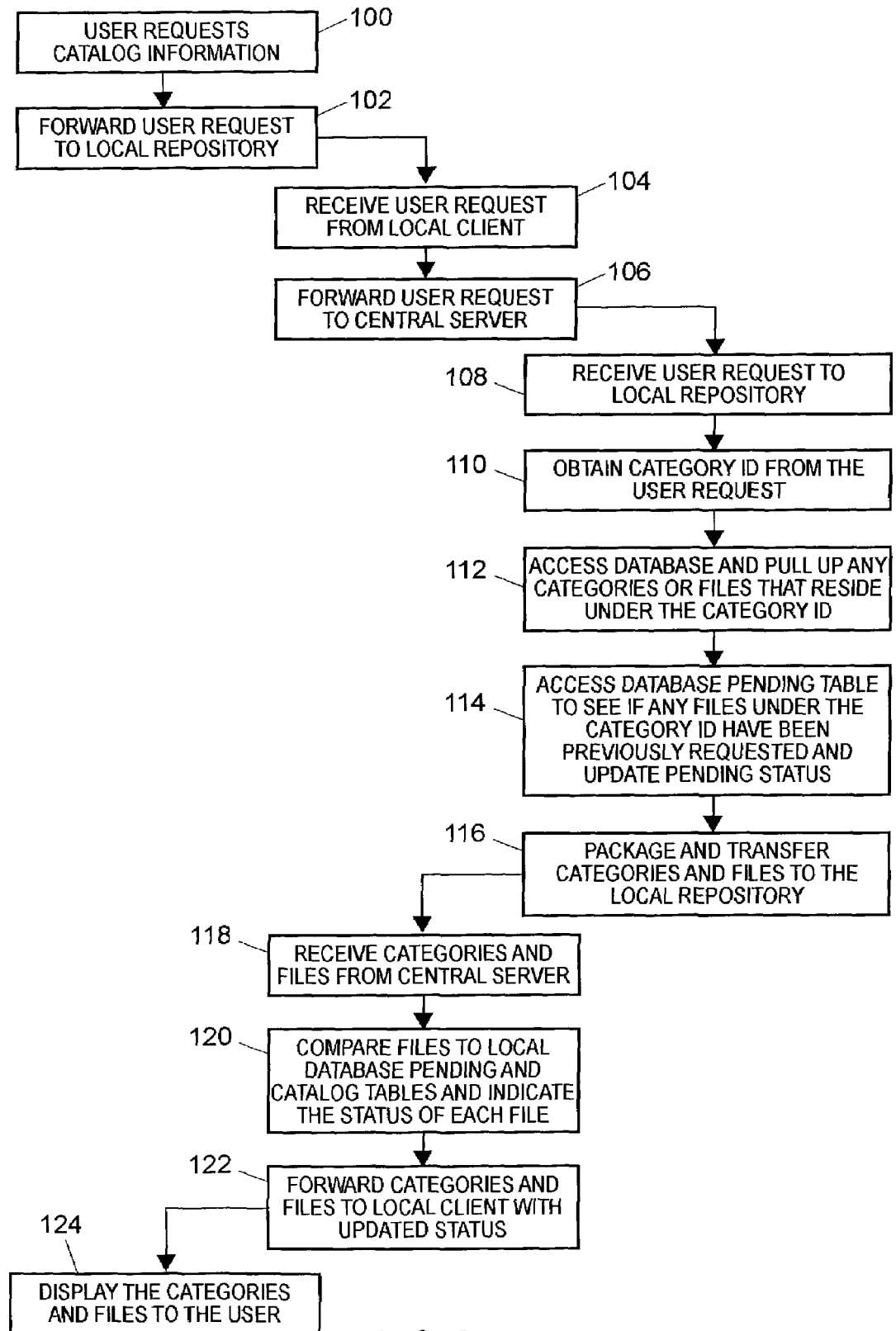
FIG. 2 is a flow diagram illustrating an example process by which a menu presentation may be carried out.

FIG. 2, which is arranged into three columns, is a flow diagram illustrating an example process by which a menu presentation may be carried out. The left column represents actions that take place at the local client 12 (FIG. 1), the middle column represents actions that take place at the local repository 14 (FIG. 1) and the right column represents actions that take place at the central server 16 (FIG. 1). As noted above, the functionality attributed to the local client 12 could be carried out by the local repository 14.

A user making a request for catalog information initiates menu presentation. Upon receiving the request from the user (block 100), the local client 12 forwards the request to the local repository 14 (block 102). The request from the user includes a category identifier (category ID) that corresponds to the information that the user has indicated a desire to view. The category ID may correspond to further categories or to files or programs that fall under the category ID. The local repository 14 receives the request from the local client 12 (block 104) and forwards the request to the central server 16 (block 106).

Upon receiving the user request from the central server (block 108), the central server 16 obtains the category ID, which defines the menu information requested by the user (block 110). Having obtained the category ID, the central server 16 accesses the catalog table 42 of the database 24 and pulls up any categories or titles of programs that reside under the requested category ID (block 112). For example, if a category ID of 15 points to a directory level including three submenus and four programs, the central server 16 would pull three submenus and the titles of the four programs from the database 24.

The central server 16 then accesses the pending request table 44 of the database 24 to determine if any of the files that fall under the requested category ID have been previously requested (block 114). If the files or programs listed under the requested category ID have been previously requested, the pending statuses of the files are updated to reflect that the files or programs have been requested. This ensures that when a person uses the local client 12 or the local repository 14 to view a catalog page corresponding to the requested category ID, the status of the items on the catalog page is shown properly. For example, as addressed in further detail below, the status of a particular file or program shown on a catalog page may be VIEW, ORDER or PENDING. When a file or program has a VIEW file status, it is stored within the local repository 14 and may be readily displayed. When a file has an ORDER status, the file has not been requested for delivery, and when a file has a PENDING file status, the file has been requested by the local repository 14 for delivery from the central server 16.

The central server 16 may then package the titles of the files or programs, which have updated status, and categories that fall under the requested category ID and transfer the same to the local repository 14 (block 116). The local repository 14 receives the package of categories and files from the central server 16 (block 118) and compares the files in the package to the catalog table 28 of the database 20 (block 120). The status of each file is then properly reflected in the catalog page presented to the user. The local repository 14 may then forward the categories and the titles of the files or programs under the requested catalog ID to the local client 12, wherein each of the files has an updated status that reflects whether the file is viewable, pending or orderable (block 122). The local client 12 receives the categories and the list of files or programs and displays the same to the user (block 124).

Figure 3:
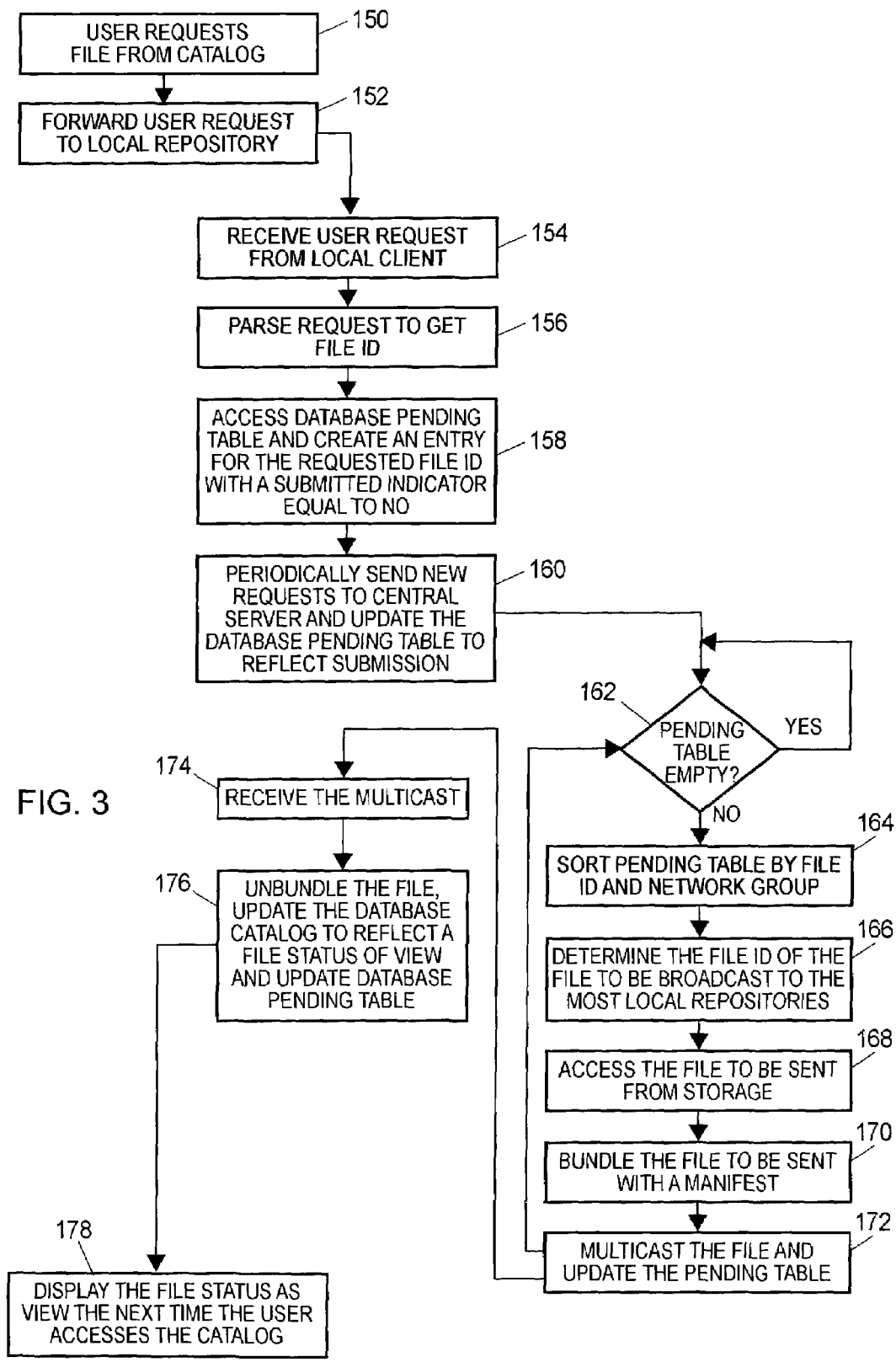
FIG. 3 is a flow diagram illustrating an example process by which file request processing may be carried out.

FIG. 3, which is arranged into three columns, is a flow diagram illustrating an example process by which file processing may be carried out. As with FIG. 2, the left, center and right columns of FIG. 3 represents actions that take place at the local client 12 (FIG. 1), the local repository 14 (FIG. 1) and the central server 16 (FIG. 1). Additionally, the functionality attributed to the local client 12 could be carried out by the local repository 14.

When a user requests a file or program, the local client 12 receives a user request for a particular program or file, which is identified by a file identifier (file ID) (block 150), the local client 12 forwards the request to the local repository 14 (block 152). The local repository 14 receives the request from the local client 12 (block 154) and parses the request to get the file ID corresponding to the file requested by the user (block 156).

After local repository 14 has determined the file ID (block 156), the local repository 14 accesses the pending request table 30 of the database 20 and creates an entry therein corresponding to the requested file ID (block 158). When the local repository 14 creates the entry corresponding to the file ID, the submitted field (40 of FIG. 1) is set to a value reflecting the fact that the file has not been submitted to the central server 16 for processing. For example, the submitted field may be set to "no" to reflect that the file has not been submitted.

At periodic intervals, which may be predefined intervals, the local repository 14 sends pending requests to the central server 16 for processing (block 160). The central server 16 may perform this task by scanning the pending requests database 30 for any entries having a submitted field equal to, for example, "no," which indicates that the file ID has not been requested. After the request is submitted from the local repository 14 to the central server 16, the local repository 14 updates the pending requests table 30 of the database 20 to reflect the fact that the file has been submitted. For example, the submitted field of the pending requests table 30 may be changed from "no" to "yes" to reflect the fact that the file has been requested.

Upon receiving the request from the local repository 14, the central server 16 creates an entry in the pending requests table 44 of the database 24. The central server 16 reviews the pending request table 44 to determine if it is empty (i.e., no files have been requested) (block 162). If the central server 16 determines that the pending request table 44 is not empty, the central server 16 sorts the pending request table 44 according to file ID and the network group to which the requester subscribes (block 164).

The central server 16 then determines the file ID of the file to be broadcast to the greatest number of local repositories (i.e., the file that is most efficiently distributed throughout the system 10 by multicast to the greatest number of recipients) (block 166). After the central server 16 determines the file ID of the file that may be most efficiently distributed, the central server 16 accesses the file from storage 26 (block 168), bundles the file with a manifest file (block 170) and multicasts the file to those who are to receive the file (block 172). The central server 16 also updates the pending requests table 44 of the database 24 to reflect that the file has been multicast (block 172). After the file is multicast, the central server 16 may again check the pending request table 44 (block 162).

In practice, the central server 16 may hold requests for programs or files for, or until, a predetermined time. In one situation, a central server 16 may hold request for, by way of example, 12 hours. At the end of the 12-hour period, the central server 16 may then evaluate which files can be multicast most efficiently. In another situation, the central server 16 may hold requests until, for example, two-o'clock in the morning, which time the central server will evaluate which files may be transmitted most efficiently. Alternatively, any other suitable time may be selected, the idea being that the information be multicast at a time when network congestion is low. As a further alternative, the time for multicast may be selected to coincide with a time of day when network bandwidth is the least expensive.

Holding program or file requests provides an advantage of enabling multicasting of the programs or files that have been requested. For example, if the central server 16 processed requests immediately upon their receipt, the central server 16 could be forced to broadcast the same 3 MB file four times over a particular three-hour period during which three different users request the files, resulting in the broadcast of 12 MB of data over the three-hour period. In contrast, by holding requests and multicasting requested files, the 3 MB file could be broadcast one time to service all of the requests received during the exemplary three-hour period of time, thereby saving 9 MB of broadcast bandwidth.

Another added benefit to holding requests for or until a particular point in time is that the multicast of the programs or files can be made at off-peak bandwidth times. Because most requests for programs are likely made during the day when people are working, servicing the requests immediately would mean broadcasting the program during the daytime when broadcast traffic is highest and most expensive. Holding the requests and multicasting the programs at night, when bandwidth usage is lower and less expensive, may, in fact, reduce the cost of the multicast by using off-peak bandwidth.

Continue with the description of FIG. 3, the local repositories (e.g., the local repository 14) that are to receive the file receive the multicast (block 174) and unbundle the file (block 176). The local repository 14 also updates its associated catalog table 28 to reflect the fact that the file is now stored locally by changing the status of the file from ORDER to REQUEST (block 176). The local repository 14 also updates the pending request table 30 to eliminate any entry corresponding to the file that has been received (block 176). Because the file status has been updated (block 176), when the local client 12 displays the name of the file, the file status will accurately reflect the state of the file the next time a user accesses the catalog (block 178).

Figure 4:
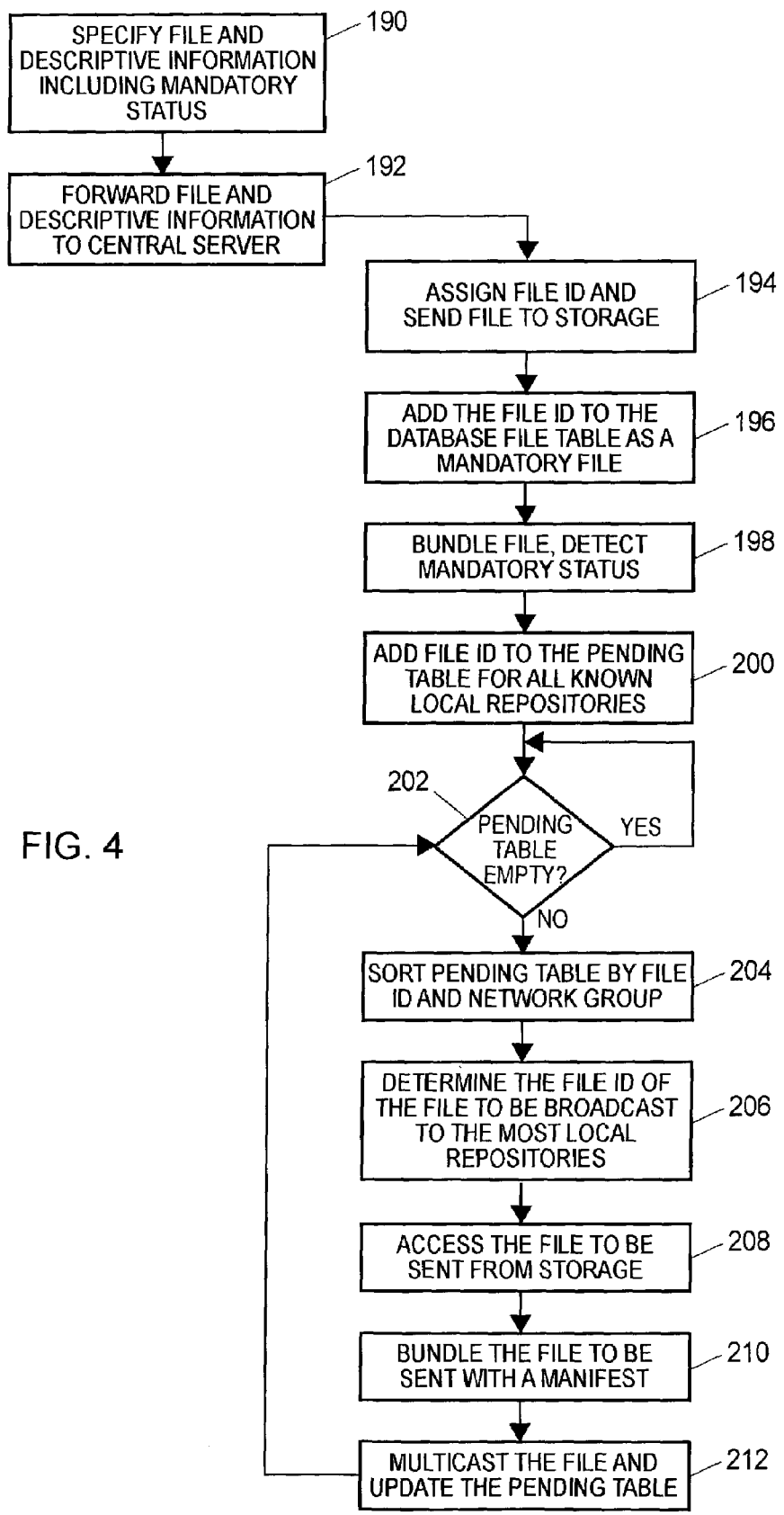
FIG. 4 is a flow diagram illustrating an example process by which files may be pushed to local repositories.

Turning now to FIG. 4, a flow diagram is shown to illustrate an example process by which a particular file or files may be pushed to local repositories by making the a mandatory. The left and right columns of FIG. 4 represents actions that take place at the admin station 18 (FIG. 1) and the central server 16 (FIG. 1), respectively. In general, a file, a program or other form of information may be selected by an administrator at the admin station 18 (FIG. 1) for multicast to each local repository (e.g., the local repository 14). For example, if an important message from the CEO of a corporation is to be sent to all local repositories, a video of the message in, for example, MPEG compressed video format, may be transferred from the admin station 18 to the central server 16 as a mandatory file. The central server 16, in turn, multicasts the mandatory video message to all of the local repositories 14 that are to receive the mandatory file.

When a user selects a file for transfer to local repositories, the user specifies to the admin station 18 a file and descriptive information that may include, among other information, an indication of mandatory status (block 190). Upon receiving the file and the descriptive information, the admin station 18 forwards the same to the central server 16 (block 192). The central server 16 receives the file and the descriptive information and assigns a file ID to the file. The central server 16 then sends the file to storage 26 and enters the file ID into the file table 48 of the database 24 as a mandatory file (blocks 194 and 196). The mandatory nature of the file may be reflected in the mandatory field 64 of the file table 48.

The central server 16 then bundles the file so that the file is ready for transmission and detects the mandatory status of the file through examination of the mandatory field 64 (block 198). The file ID is then added to the pending requests table 44 of the database 24 for all known local repositories (block 200).

As described in detail in conjunction with FIG. 3, the central server 16 may periodically check the pending requests table 44 of the database 24 to determine if there are files or programs that need to be multicast to one or more local repositories (block 202). If there are no files in the pending requests table 44, the central server 16 may continue to scan the pending requests table 44 or may, upon finding entries in the pending requests table 44, sort the pending requests table 44 by file ID and network group (block 204).

The central server 16 may then determine the file ID that is to be multicast to the greatest number of local repositories (block 206). Because mandatory files are to be multicast to all available local repositories, mandatory files are likely multicast with a high priority as compared to other files that are to be multicast to one or a few local repositories.

When it is time to multicast the mandatory file, the mandatory file is accessed from storage 26 and bundled with a manifest file (blocks 208 and 210). The central server 16 then multicasts the mandatory file and updates the pending request table 44 to reflect that the mandatory file has been multicast.

The handling of files once they have been multicast by the central server 16 has been previously described in connection with FIG. 3. In general, upon receiving the multicast information, a local repository (e.g., the local repository 14) may update one or more of its tables to reflect that the mandatory file is stored locally, is not pending and does not have to be requested from the central server 16. The next time that a user accesses the local client 12 or uses the local repository 14, the newly added mandatory file will be presented to the user as having a VIEW status, which indicates that the user may view the contents of the mandatory file merely by selecting an icon or a name associated with the mandatory file.

Having described various processes that may be carried out on the system 10, attention will now turn to various interface screens that may be used to interact with the system 10. The interface screens may be presented on the local clients 12 only, on the local repository 14 only, or on both the local clients 12 and the local repository 14. The interface screens described in detail hereinafter may be constructed using any know and commercially available software package that is adapted to allow the generation of graphical user interfaces (GUIs) that may be displayed within a web browser such as, for example, Microsoft's Internet Explorer.

Figure 5:
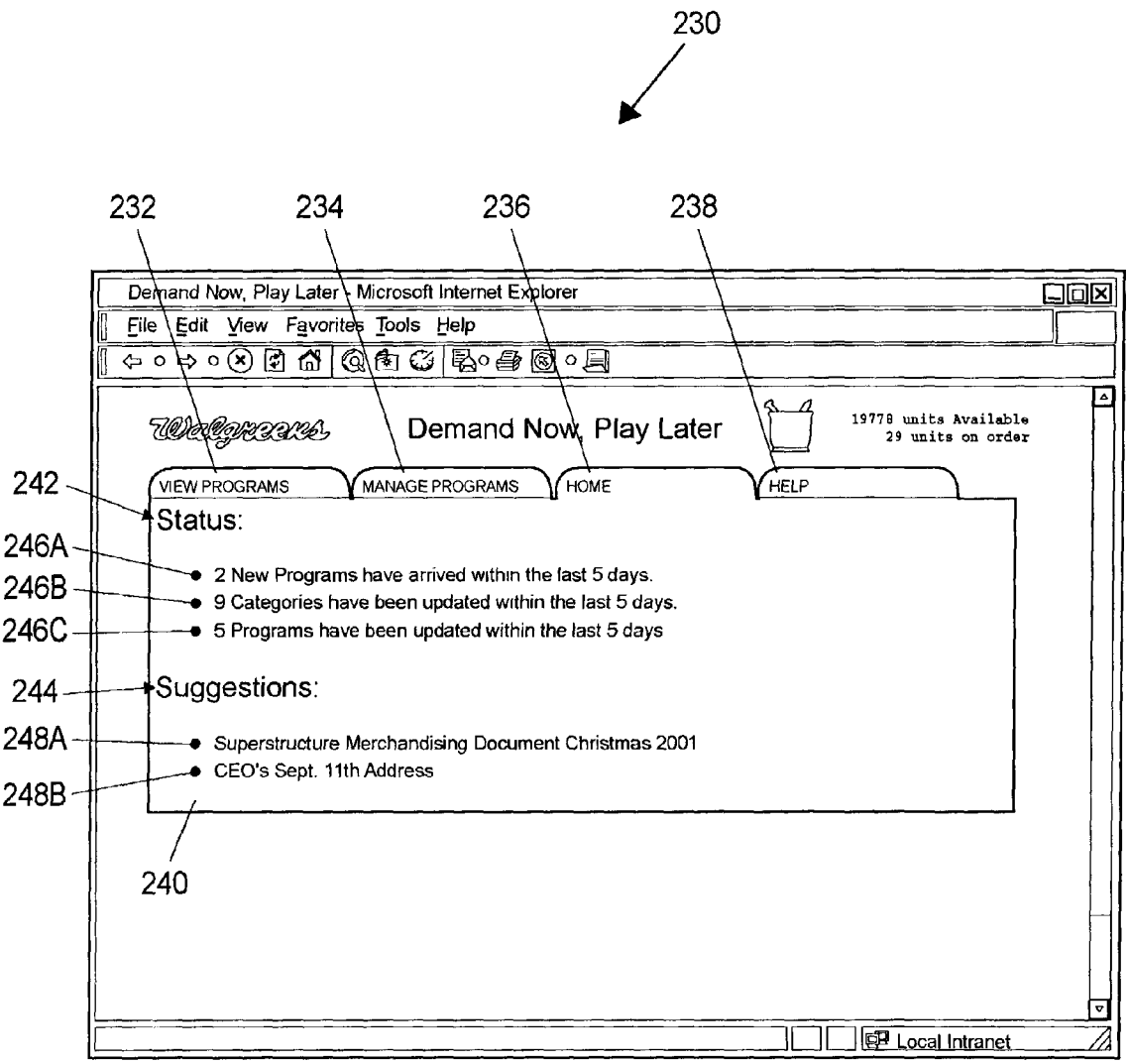
FIG. 5 is an example home screen display of the information distribution system.

Turning to FIG. 5, a home screen display 230 of the system 10 may include VIEW PROGRAMS, MANAGE PROGRAMS, HOME and HELP tabs, which are referred to with reference numerals 232, 234, 236 and 238, respectively. The home display screen 230, which is displayed when the HOME tab 236 is selected, also includes a content area 240 in which content related to the selected one of the tabs 232-238 may be displayed. For example, the content area 240 may include a status portion 242 and a suggestions portion 244.

The status portion 242 may include a number of entries 246A-246C. These entries may provide information pertinent to the number of programs that have arrived in the past number of days (246A), the number of menu categories that have been updated in the past number of days (246B) and the number of programs that have been updated in the past number of days (246C).

The suggestions portion 244 may include a number of entries 248A-248B that provide suggested programs for a user to view. For example, the suggestions portion 244 may include links to documents that are pertinent to particular portions of a retail cycle (248A). Additionally, the suggestions portion 244 may include links to documents that are of a timely nature, such as, for example, a presentation of corporate personnel (248B).

Figure 6:
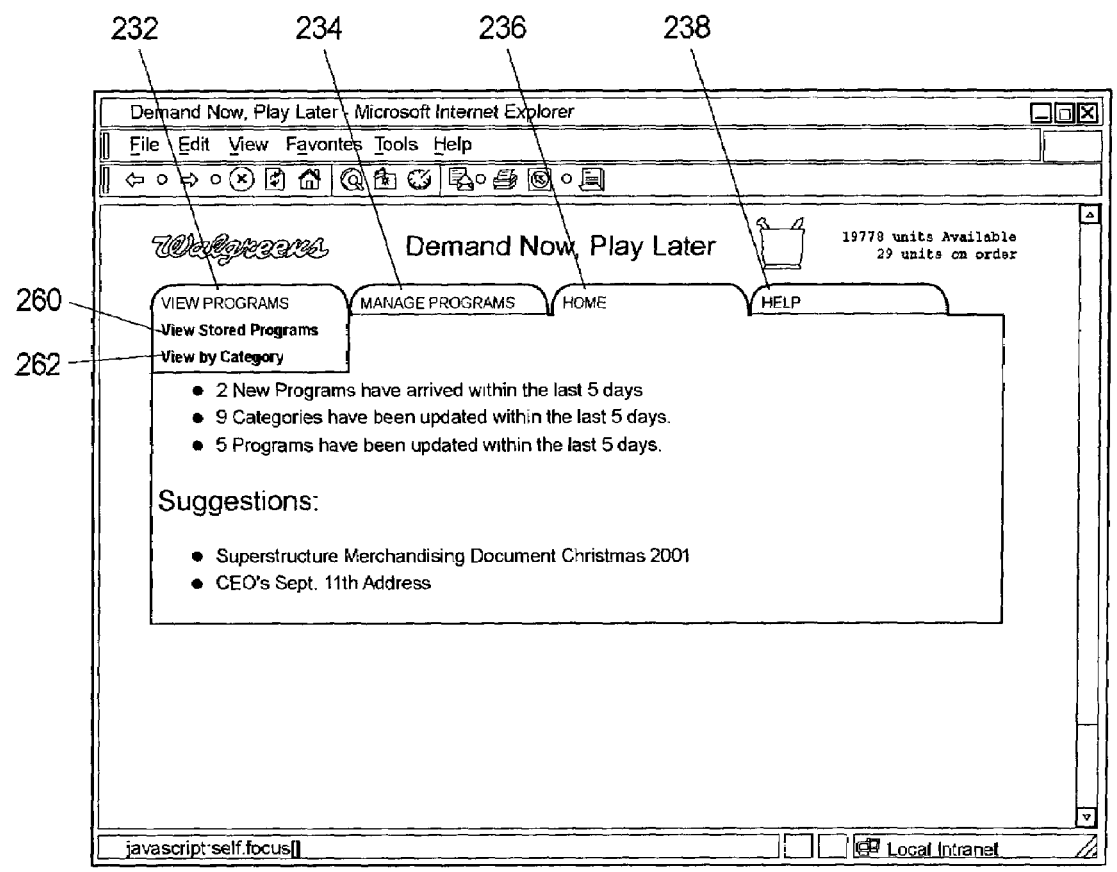
FIG. 6 is an example home screen display of the information distribution system having the view programs tab selected.

As shown in FIG. 6, the VIEW PROGRAMS tab 232 may include a VIEW STORED PROGRAMS entry 260 and a VIEW BY CATEGORY entry 262 that a user may choose when the user selects the VIEW PROGRAMS tab 232. If the user selects the VIEW STORED PROGRAMS entry 260, the user may be presented with a view stored programs display screen similar to the display screen 270 of FIG. 7. The view stored programs display screen 270 may include a number of fields, which may include, but are not limited to ACTION 272, CATEGORY 274, TITLE 276, RECEIVED 278 and SIZE 280.

The ACTION field 272 reflects the status of a particular program. For example, if a program is presently stored in the local repository 14 (FIG. 1), the ACTION field 272 may provide the user with an available action of VIEW. Alternatively, if a program is not stored in the local repository 14, the ACTION field 272 may provide the user with an available action of ORDER, which allows the user to request the central server 16 to multicast the desired program to the local repository 14. If a user has previously requested delivery of a program, but the central server 16 has not yet multicast the desired program, the ACTION field 272 may reflect this fact by showing PENDING therein. For example, a user may request delivery of a program and the central server 16 may hold that request until a later point in time when the central server 16 may combine that request with other requests for the same program, thereby enhancing the efficiency with which programs are distributed within the system 10. The display screen 270, therefore, enables the integration of information from various sources (e.g., the local repository 14 or the central server 16) into one user interface.

The CATEGORY field 274 displays text representing the category into which the program has been grouped. The text used for display in the CATEGORY field 274 may be derived from descriptive information provided by the administrator to the admin station 18 when a program is uploaded to the central server 16 from the admin station 18. Details regarding uploading of information by the admin station 18 have been previously provided in conjunction with FIG. 4.

The TITLE field 276 displays a textual title of the program. As with the CATEGORY field 274, information for the TITLE field 276 may be derived directly or indirectly from descriptive information provided by the administrator when a program is uploaded to the central server 16.

The RECEIVED field 278 displays information indicative of the date, and optionally, the time, at which the local repository 14 received the program from the central server 16. Accordingly, the RECEIVED field 278 provides information as to the age of the program and enables a user to determine at what point in time a particular program first had an ACTION field 272 reflecting that the program could be viewed.

The SIZE field 280 reflects the size of the program of interest. For example, the size of a file may be reflected in bytes, bits, blocks or units of a predetermined increment or size. The SIZE field 280 allows a user to determine how much space each program occupies and to, thereby, more effectively manage the space usage of the local repository 14 and/or the local client 12.

Figure 7:
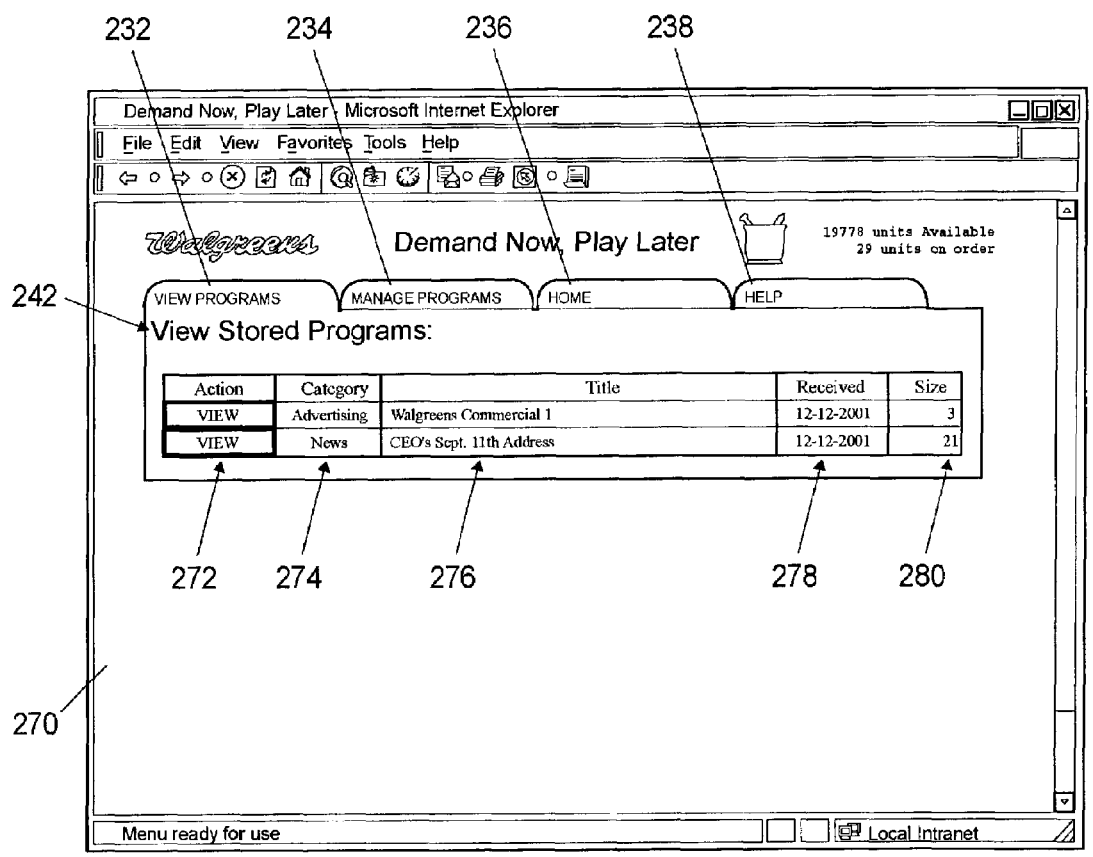
FIG. 7 is an example view stored programs screen display of the information distribution system.
Figure 8:
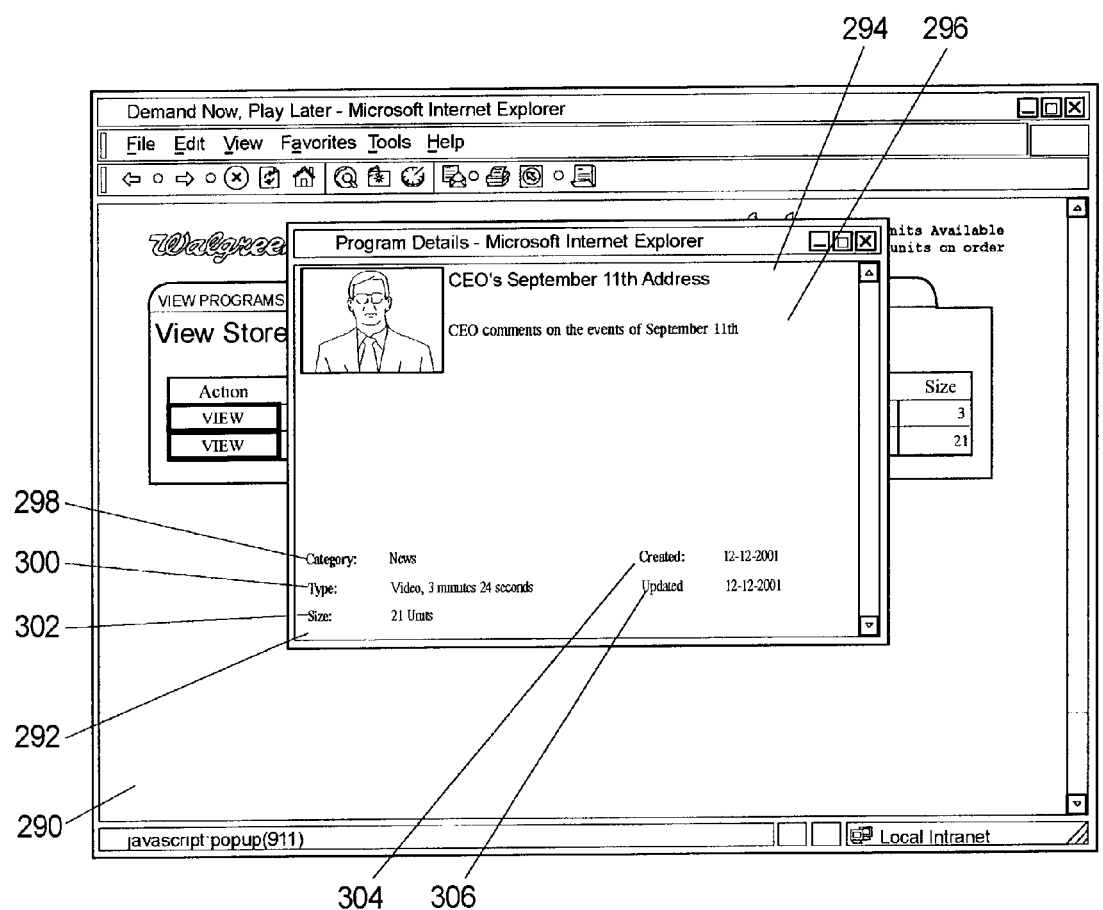
FIG. 8 is an example program details screen display selected from the view stored programs screen display of the information distribution system.

If a user presented with the display screen 270 of FIG. 7 selects the ACTION field entry corresponding to viewing the September 11$^{th}$ address, the user may then be presented with a display screen 290, as shown in FIG. 8. The display screen 290 includes a program details graphic 292, which may be presented in front of the information provided in the display screen 270 of FIG. 7.

The program details graphic 292 may include, but is not limited to, a program title 294, a description of the program 296, as well as CATEGORY, TYPE, SIZE, CREATED and UPDATED fields 298-306. Because the CATEGORY, TYPE and SIZE fields 298-302 include information previously described in conjunction with FIG. 7, a repetitive description of the same is not provided herein. The CREATED field 304 provides a date, and, optionally, a time, at which the program was created. Additionally, the UPDATED field 306 provides information pertinent to when the program was updated. If no prior version of the program existed, the CREATED and UPDATED fields 304, 306 will include identical information, as they do in FIG. 8.

Either by selecting to view a program from the display screen 270 of FIG. 7 or, optionally, by opting to view a program from the program details graphic 292, the user may be presented with a display screen 320 (FIG. 9) that displays the selected program in a video window 322. A control panel 324 may also be provided to allow a user to control the video. For example, the control panel 324 may include controls that allow a user to play, pause, fast-forward and rewind the video displayed within the video window 322. The control panel 324 may also include controls that enable a viewer to control the volume or to mute audio associated with the video displayed in the video window 322. In practice, the video window 322 and the control panel 324 may be embodied in, for example, a Windows-based media player or the like.

Figure 10:
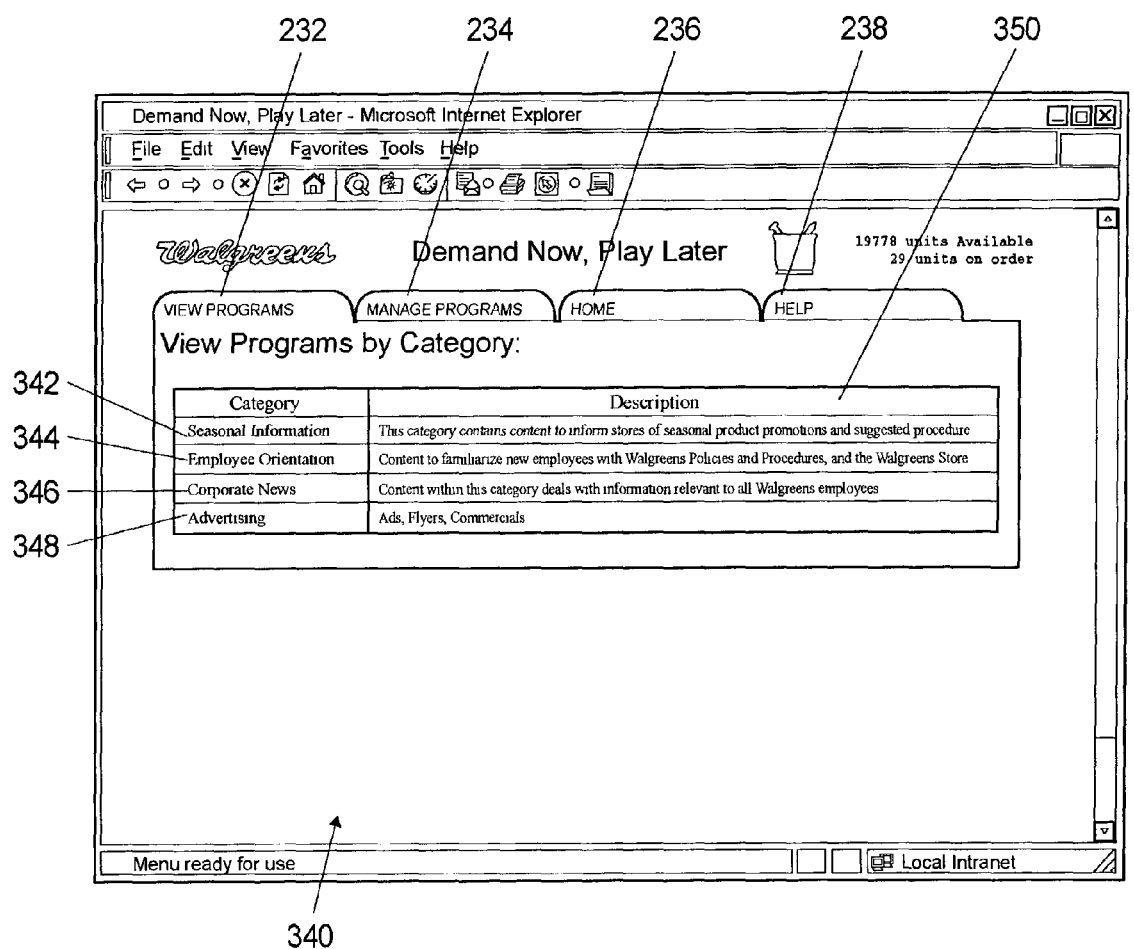
FIG. 10 is an example view programs by category screen display of the information distribution system.

Returning briefly to FIG. 6, if a user selects the VIEW BY CATEGORY entry 262 of the VIEW PROGRAMS tab 232, the user may be presented with a display screen 340 as shown in FIG. 10. On the display screen 340, programs may be grouped into several different categories. For example, as shown in FIG. 10, for a retail establishment, the categories may include SEASONAL INFORMATION 342, EMPLOYEE ORIENTATION 344, CORPORATE NEWS 346 and ADVERTISING 348. In addition to the name of each category, the display screen 340 may include a description column 350 including a description of each category.

Figure 11:
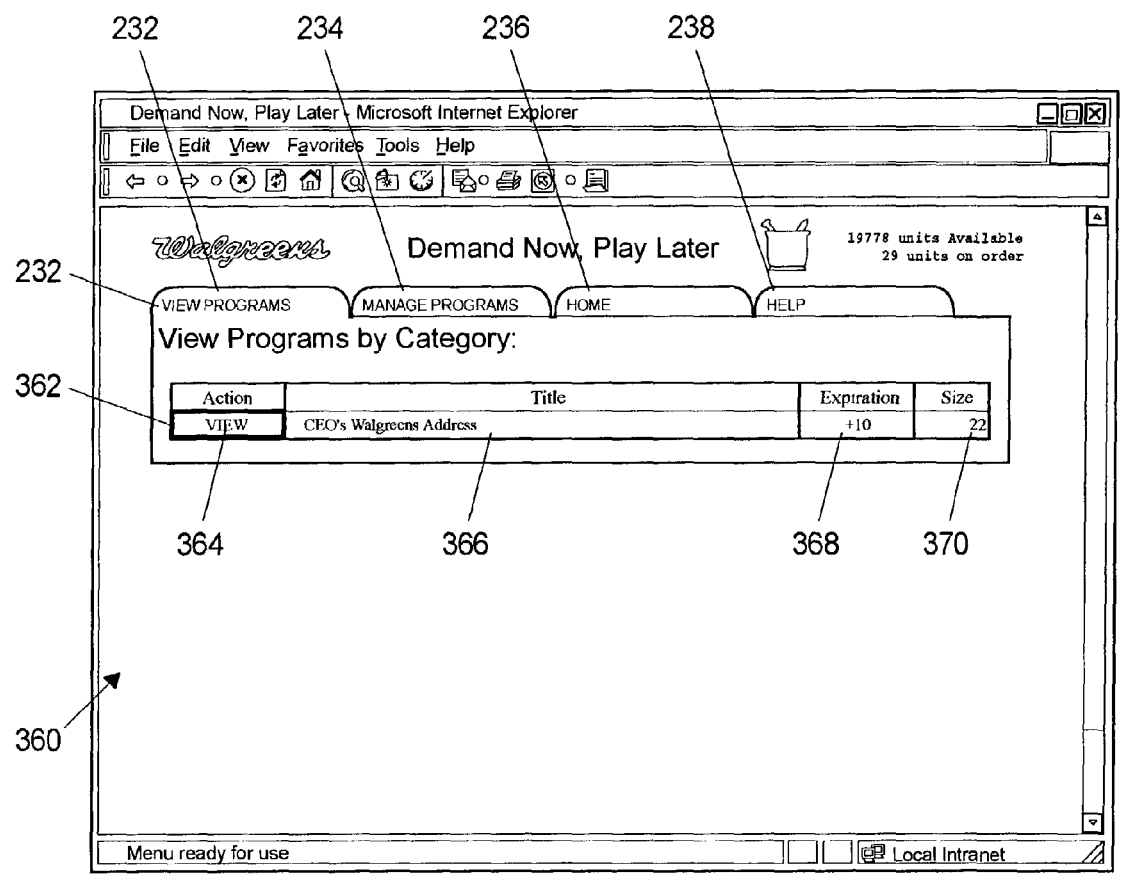
FIG. 11 is an example view programs screen display of the information distribution system having the corporate news subcategory displayed.

In one implementation, a user could select a particular category and be presented with a new display screen including each program that falls within the selected category. For example, if a user were presented with the display screen 340 of FIG. 10 and the user selected the CORPORATE NEWS category 346, the user could be presented with a display screen 360 as shown in FIG. 11. The display screen 360 includes an entry 362 representing the single program that resides under the CORPORATE NEWS category 346.

Figure 9:
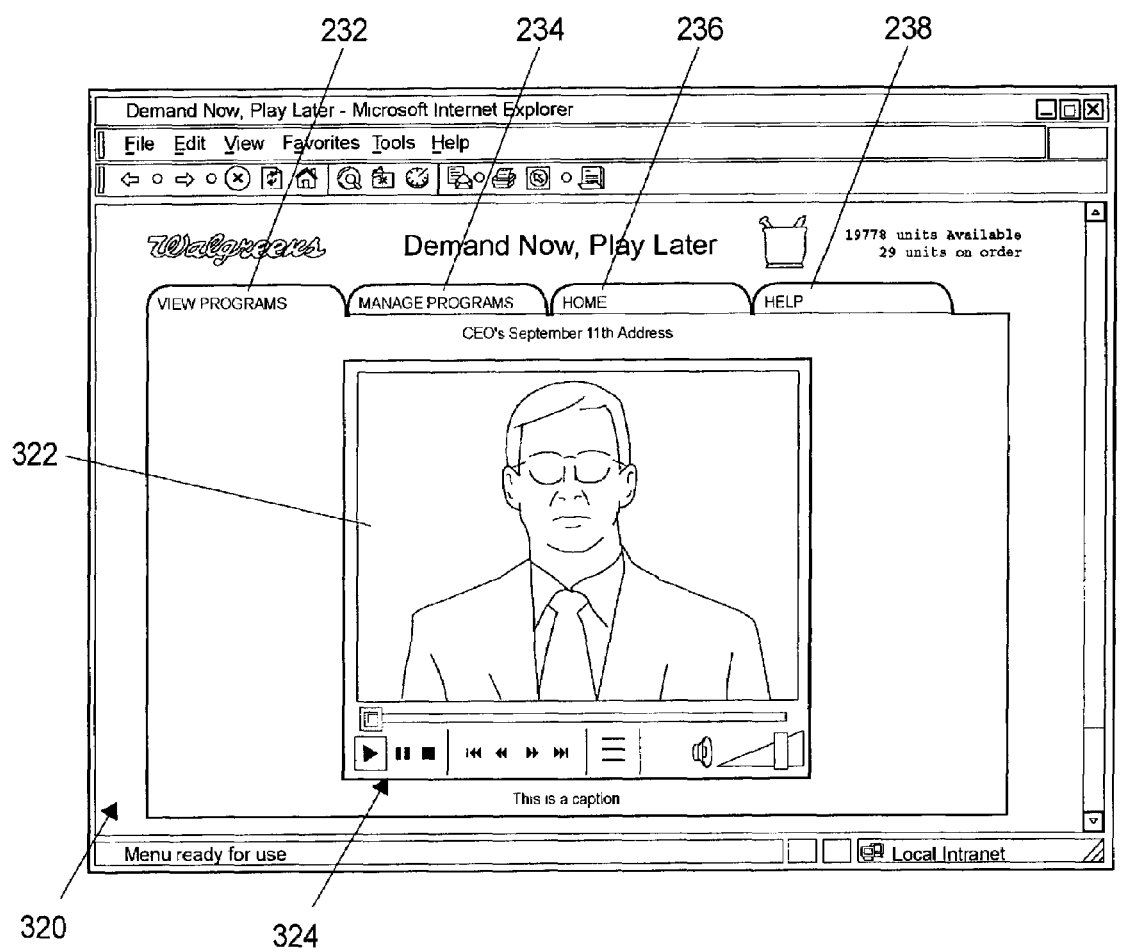
FIG. 9 is an example screen display of a program of the information distribution system.

The display screen 360 may include ACTION 364, TITLE 366, EXPIRATION 368 and SIZE 370 fields. The ACTION 364, TITLE 366 and SIZE 370 fields provide the same functionality described in conjunction with FIG. 7. For example, as with the description provided in conjunction with FIG. 7, the selection of the VIEW text shown in the ACTION field 364 will result in the program being presented to the user as shown in FIG. 9.

The EXPIRATION field 368 of the display screen 360 provides an indication of when a particular program will expire, or be made unavailable for viewing. For example, as shown in FIG. 11, the entry 362 is set to expire in ten days. The expiration period, which prevents old information from being viewed when newer and more current information is available, may be provided by the administrator as a part of the description information provided when the file is uploaded to the central server 16 (See, for example, FIG. 4).

Figure 12:
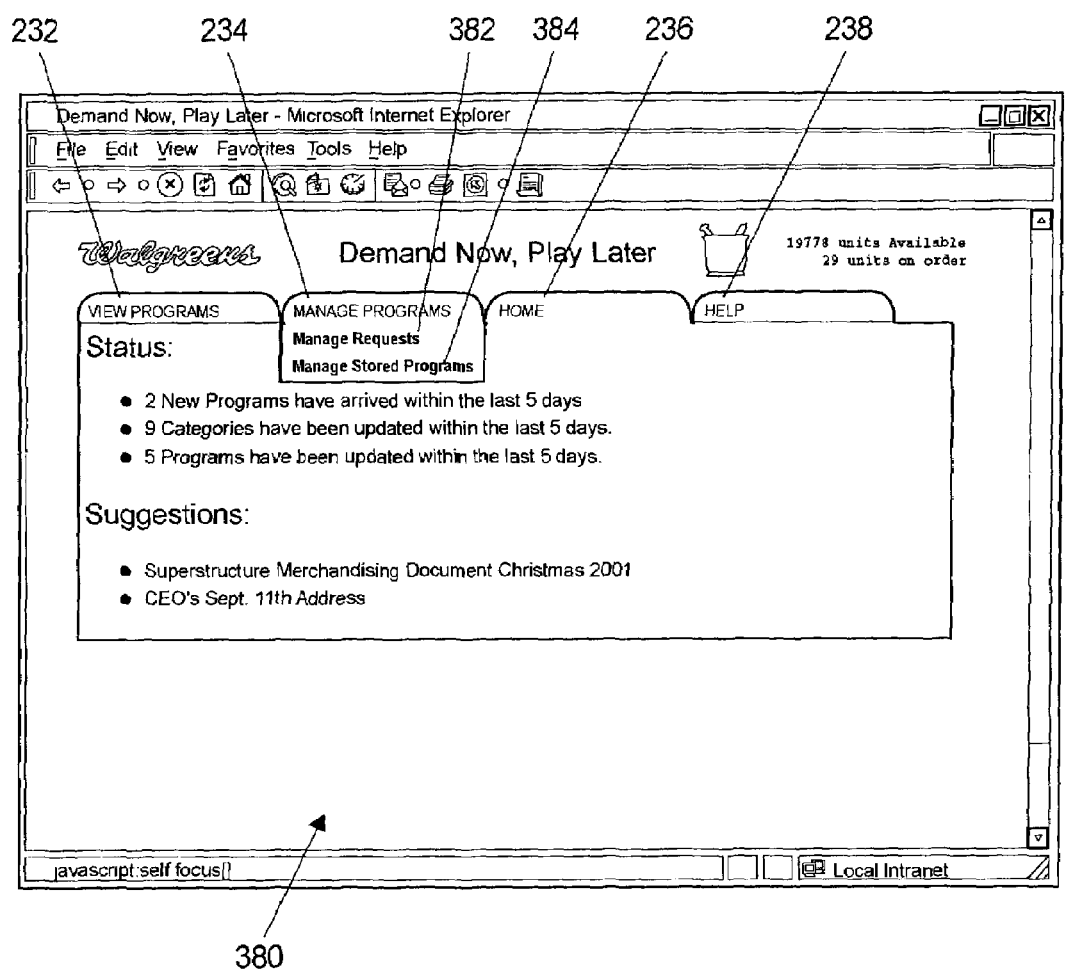
FIG. 12 is an example home screen display of the information distribution system having the manage programs tab selected.
Figure 13:
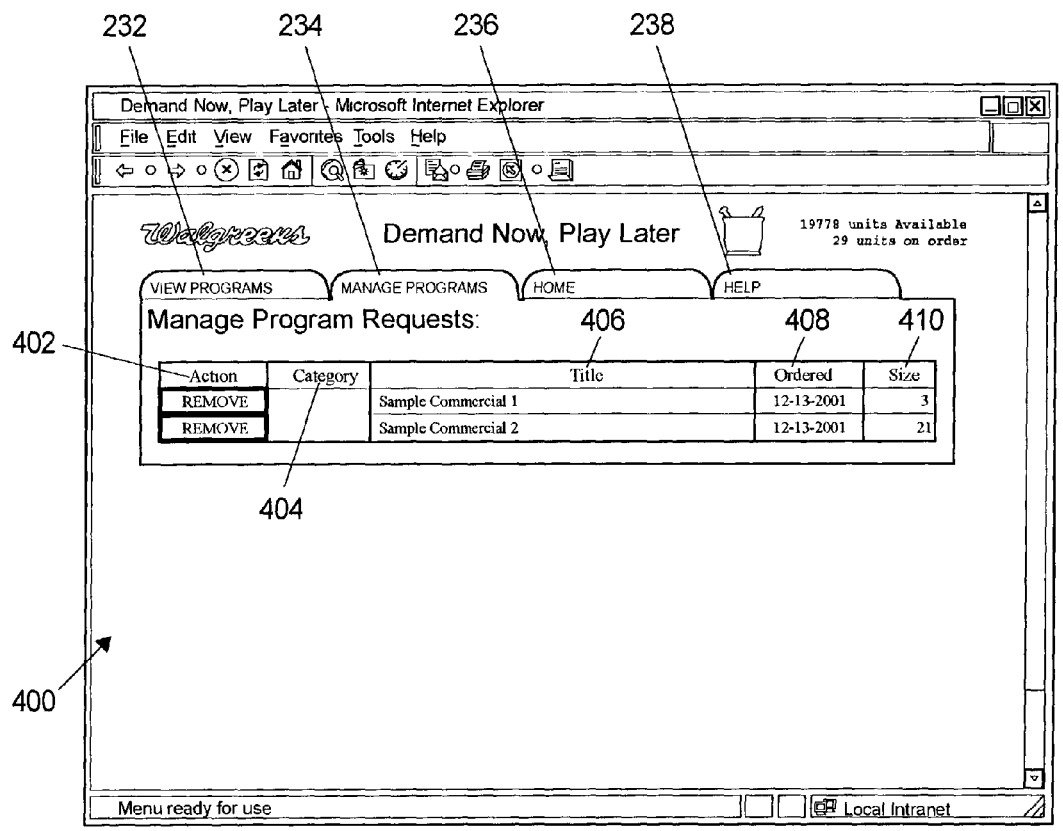
FIG. 13 is an example manage program requests screen display of the information distribution system.

Turning now to FIG. 12, a display screen 380 having the MANAGE PROGRAMS tab 234 selected reveals MANAGE REQUESTS and MANAGE STORED PROGRAMS entries 382 and 384, respectively, that are associated therewith. The selection of the MANAGE REQUESTS entry 382 results in the user being presented with a MANAGE PROGRAM REQUESTS display screen 400, as shown in FIG. 13. In general, the MANAGE PROGRAM REQUESTS display screen 400 allows a user to cancel, or remove, any requests made to the central server 16 (FIG. 1) that are pending and have not been serviced.

The MANAGE PROGRAM REQUESTS display screen 400 includes ACTION 402, CATEGORY 404, TITLE 406, ORDERED 408 and SIZE 410 fields. The ACTION field 402 includes text, the selection of which allows the user to indicate a desire to remove the program of interest from the queue of programs selected for delivery from the central server 16. In the display screen 400, the text is represented as REMOVE, but any other suitable text could be selected for use. The functionality of being able to remove a program from the request queue can be used to cancel requests made of the central server 16 in the event that the requester no longer desires the program, thereby preventing the unnecessary use of resources for information that is not desired.

As will be readily appreciated from the context of the display screen 400, the CATEGORY 404, TITLE 406 and SIZE 410 fields provide the user information on the category in which requested programs fall, the title of the requested programs and the size of the requested programs. The ORDERED field 408 reflects the date or date and time at which a particular program was ordered for delivery from the central server 16.

Returning briefly to FIG. 12, if the user selects the MANAGE STORED PROGRAMS entry 384, the user may be presented with a MANAGE STORED PROGRAMS display screen 430. The display screen 430 includes information on four programs 432-438, which are arranged into rows. Each row has five associated fields: ACTION 440, CATEGORY 442, TITLE 444, EXPIRATION 446 and SIZE 448.

The ACTION field 440 of each program includes REMOVE and EXTEND options, which are referred to with reference numerals 450A-D (collectively 450) and 452A-D (collectively 452), respectively. The REMOVE option 450 enables a user to delete a program that is stored in the database 20 and/or the storage component 22 of the local repository 14, thereby freeing resources of the local repository 14 for other programs.

The EXTEND option 452 allows a user to extend the expiration period of a particular program. For example, while the program referred to with reference numeral 432 is shown to expire on Oct. 9, 2001, a user could potentially extend that expiration date to another, later date through the use of the EXTEND option 452A. Optionally, a user may have to enter a password or pass some other security clearance to extend the expiration date of the program.

Figure 14:
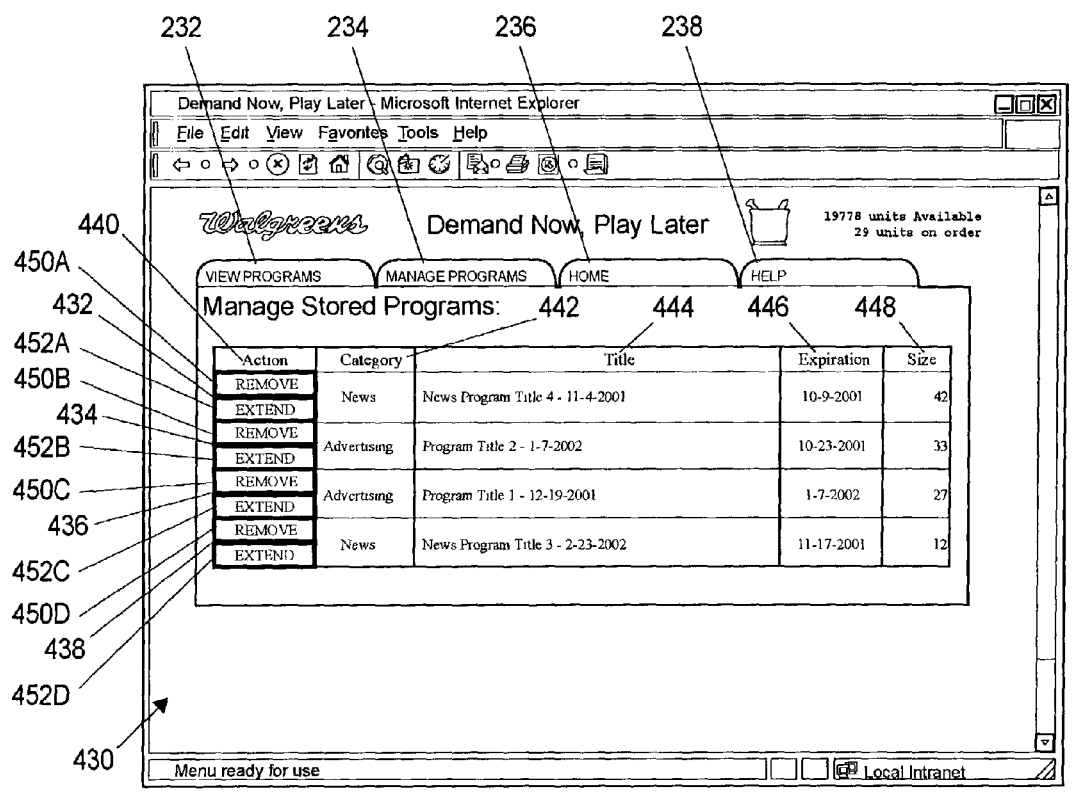
FIG. 14 is an example manage stored programs screen display of the information distribution system.

The CATEGORY, TITLE, EXPIRATION and SIZE fields 442-448 have been previously described in connection with various ones of FIGS. 7, 11 and 13 and, therefore, are not described in detail in conjunction with FIG. 14.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A content delivery system, comprising: a storage component including a first and second portions of information; and a server including software that is executable to:

receive a first request from a first entity for the first portions of information, receive a second request from a second entity for the second portion of information, hold the first request for the one or more first portions of information and the second request for the second portion of information for a period of time while waiting to receive subsequent requests from other entities for the first or second portion of information, and compare a number of first requests received and a number of second requests received to determine which of the first portion of information or the second portion of information would be transmitted to a greatest number of entities if either the first request or the second request were fulfilled, and simultaneously transmit, at the expiration of the period of time, the first portion of information to the first entity and any other entities that requested the first portion of information if the first portion of information would be transmitted to the greatest number of entities, or simultaneously transmit, at the expiration of the period of time, the second portion of information to the second entity and any other entities that requested the second portion of information if the second portion of information would be transmitted to the greatest number of entities, so that the software is executable to efficiently fulfill the first and second requests;

wherein the first portion of information transmitted to the first entity and the first portion of information transmitted to any other entities include identical content; and wherein the second portion of information transmitted to the second entity and the second portion of information transmitted to any other entities include identical content.

2. The content delivery system of claim 1, wherein the entity comprises an information repository comprising local content, wherein the local content includes the portion of information transmitted from the server that fulfills a previous request.

3. The content delivery system of claim 2, wherein the first and second entities comprise a menu system comprising menu entries representative of the local content of the information repository and menu entries representative of information stored in the storage component.

4. The content delivery system of claim 3, wherein the menu system enables a user to indicate a desire to view information stored in the storage component.

5. The content delivery system of claim 3, wherein the menu entries representative of the local content and the menu entries representative of information stored in the storage component are organized by categories in the menu system.

6. The content delivery system of claim 5, wherein the categories in the menu system comprise categories selected from the group consisting of seasonal information, employee orientation, corporate news and advertising.

7. The content delivery system of claim 1, wherein the server is adapted to multicast the first and second portions of information to the greatest number of entities.

8. A method of delivering information from a location comprising a storage component storing a first portion of information and a second portion of information, a database storing a list that describes the first and second portions of information stored in the storage component, and a server, the method comprising:

receiving at the location one or more first request from one or more entities for the first portion of information;

receiving at the location one or more second requests from one or more entities for the second portion of information;

holding the one or more first and second requests for a period of time while waiting to receive subsequent first and second requests at the location;

determining, at the expiration of the period of time, a number of first requests and a number of second requests;

comparing the number of first requests and the number of second requests to determine which of the first portion of information or the second portion of information would be transmitted to a greatest number of entities if either the one or more first requests or the one or more second requests were fulfilled;

reading, at the expiration of the period of time, the first portion of information if it would be transmitted to the greatest number of entities, or the second portion of information if it would be transmitted to the greatest number of entities; and simultaneously transmitting either the first portion or second portion of information from the location to the greatest number of entities that requested either the first portion or second portion of information so that the first and second portions of information are efficiently transmitted to the greatest number of entities;

wherein the first portion of information transmitted to a first entity and the first portion of information transmitted to any other entities include identical content; and wherein the second portion of information transmitted to a second entity and the second portion of information transmitted to any other entities include identical content.

9. The method of claim 8, wherein the one or more entities comprise an information repository comprising local content, wherein the local content includes the portion of information sent from the server that fulfills a previous request from the one or more entities.

10. The method of claim 9, further comprising presenting at the one or more entities a menu comprising menu entries representative of the local content of the information repository and menu entries representative of information stored in the storage component.

11. The method of claim 10, further comprising enabling a user to indicate a desire to view information stored in the storage component.

12. The method of claim 10, further comprising presenting the menu entries representative of the local content and the menu entries representative of information stored in the storage component in a manner organized by categories.

13. The method of claim 12, wherein the categories are selected from the group consisting of seasonal information, employee orientation, corporate news and advertising.

14. The method of claim 8, wherein simultaneously transmitting either the first or second portion of information from the location to the greatest number of entities that requested either the first or second portion of information comprises multicasting the portion of information to the greatest number of entities that requested the portion of information.

15. A content delivery system, comprising:
a storage component storing a plurality of portions of information;
a database storing a list of the plurality of portions of information stored in the storage component, the list including a plurality of identifiers to identify each one of the plurality of portions of information, the list also including a plurality of submitted fields to indicate whether or not a request for each one of the plurality of portions of information corresponding to the identifier has been fulfilled; and
a server including software to:
receive, from a plurality of first entities, a first request for a first portion of information of the plurality of portions of information, the first request including a first identifier of the plurality of identifiers, the first identifier to identify the first portion of information,
receive, from a plurality of second entities, a second request for a second portion of information of the plurality of portions of information, the second request including a second identifier of the plurality of identifiers, the second identifier to identify the second portion of information,
hold first request and the second request until a predetermined time to receive subsequent requests from other entities for one or more of the first portion of information and the second portion of information,
access, at the predetermined time, the storage component to read one or more of the first portion of information and the second portion of information if one or more of a respective first submitted field and second submitted field of the plurality of submitted fields indicates that one or more of the first request and the second request has not been fulfilled,
compare a number of first requests received from the plurality of first entities and a number of second requests received from the plurality of second entities to determine which of the first portion of information and the second portion of information would be transmitted to a greatest number of entities if either the first request or the second request were fulfilled, and
simultaneously transmit either the first portion of information or the second portion of information to the greatest number of entities so that the system efficiently transmits the first portion of information to the plurality of first entities and the second portion of information to the plurality of second entities.

16. The content delivery system of claim 15, wherein one or more of the plurality of first and second entities comprises an information repository comprising local content, wherein the local content includes a portion of information sent from the server that fulfills a previous request from the first or second entity.

17. The content delivery system of claim 16, wherein one or more of the plurality of first and second entities comprises a menu system comprising menu entries representative of the local content of the information repository and menu entries representative of information stored in the storage component.

18. The content delivery system of claim 17, wherein the menu system enables a user to indicate a desire to view information stored in the storage component.

19. The content delivery system of claim 17, wherein the menu entries representative of the local content and the menu entries representative of information stored in the storage component are organized by categories in the menu system.

20. The content delivery system of claim 19, wherein the categories in the menu system comprise categories selected from the group consisting of seasonal information, employee orientation, corporate news and advertising.

21. The content delivery system of claim 15, wherein the server is adapted to multicast either the first portion of information or the second portion of information to the greatest number of entities.

22. The content delivery system of claim 15, wherein the predetermined time is a time at which network congestion is low.

23. The content delivery system of claim 15, wherein the predetermined time is a time at which an expense of transmitting information is reduced.

24. A method of delivering information from a location comprising a storage component storing a portion of information and a server, the method comprising:
receiving at the location from a plurality of first entities, a plurality of first requests for a first portion of information of the plurality of portions of information;

receiving at the location from a plurality of second entities, a plurality of second requests for a second portion of information of the plurality of portions of information;

holding the plurality of first requests and the plurality of second requests until a predetermined time to receive subsequent requests at the location from other entities for one or more of the first portion of information and the second portion of information;

accessing, at the predetermined time, the storage component to read one or more of the first portion of information and the second portion of information if a respective one or more of the plurality first requests and the plurality of second requests has not been fulfilled;

comparing a number of the plurality of first requests received from the plurality of first entities and a number of the plurality of second requests received from the plurality of second entities to determine which of the first portion of information or the second portion of information would be transmitted to a greatest number of entities if either the plurality of first requests or the plurality of second requests were fulfilled, simultaneously transmitting either the first portion of information or the second portion of information to the greatest number of entities;

wherein the server transmits identical portions of information to the plurality of first entities and the plurality of second entities.

25. The method of claim 24, wherein one or more of the first or second entities comprise(s) an information repository comprising local content, wherein the local content includes one or more of the first portion of information and the second portion of information sent from the server that fulfills a previous request from the plurality of first entities and the plurality of second entities, respectively.

26. The method of claim 25, further comprising presenting at one or more of the first and second entities, a menu comprising menu entries representative of the local content of the information repository and menu entries representative of information stored in the storage component.

27. The method of claim 26, further comprising enabling a user to indicate a desire to view information stored in the storage component.

28. The method of claim 26, further comprising presenting the menu entries representative of the local content and the menu entries representative of information stored in the storage component in a manner organized by categories.

29. The method of claim 28, wherein the categories are selected from the group consisting of seasonal information, employee orientation, corporate news and advertising.

30. The method of claim 24, wherein simultaneously transmitting either the first portion of information or the second portion of information comprises multicasting either the first portion of information or the second portion of information to the greatest number of entities.

31. The method of claim 24, wherein the predetermined time is a time at which network congestion is low.

32. The method of claim 24, wherein the predetermined time is a time at which an expense of transmitting information is reduced.

* * * * *

UNITED STATES PATENT AND TRADEMARK OFFICE
CERTIFICATE OF CORRECTION

PATENT NO. : 7,349,921 B2 Page 1 of 1
APPLICATION NO. : 10/256584
DATED : March 25, 2008
INVENTOR(S) : Charles Hirstius et al.

It is certified that error appears in the above-identified patent and that said Letters Patent is hereby corrected as shown below:

In the Claims:

At Column 12, line 48, "request" should be -- requests --.

At Column 14, line 28, "comprises" should be -- comprise(s) --.

At Column 14, line 34, "comprises" should be -- comprise(s) --.

Signed and Sealed this

Twenty-sixth Day of August, 2008

JON W. DUDAS
*Director of the United States Patent and Trademark Office*